United States Patent [19]

Florentin

[11] Patent Number: 5,029,787
[45] Date of Patent: Jul. 9, 1991

[54] TISSUE DISPENSER BOX HOLDER FOR VEHICLES

[76] Inventor: Baruh Florentin, 9725 SW. 127th St., Miami, Fla. 33176

[21] Appl. No.: 115,896

[22] Filed: Nov. 2, 1987

[51] Int. Cl.⁵ .............................................. F16B 47/00
[52] U.S. Cl. ............................... 248/206.3; 248/311.2; 248/905
[58] Field of Search .............. 248/311.2, 300, DIG. 5, 248/206.3, 206.4, 444.1, 905

[56] References Cited

U.S. PATENT DOCUMENTS

| | | | |
|---|---|---|---|
| 2,278,011 | 3/1942 | Murdock | 248/DIG. 5 X |
| 2,287,581 | 6/1942 | Walker | 248/DIG. 5 X |
| 2,488,326 | 11/1949 | Pratt | 248/DIG. 5 X |
| 2,836,386 | 5/1958 | Iverson | 248/DIG. 5 X |
| 3,214,059 | 10/1965 | Stark | 248/DIG. 5 X |
| 3,288,416 | 11/1966 | Franklin | 248/DIG. 5 X |
| 3,685,777 | 8/1972 | Dema | 248/300 X |
| 3,801,056 | 4/1974 | Brody | 248/DIG. 5 X |
| 3,843,085 | 10/1974 | Castro | 248/311.2 |
| 3,913,810 | 10/1975 | Shaw | 248/DIG. 5 X |
| 3,917,207 | 11/1975 | Quigley | 248/DIG. 5 X |
| 3,982,717 | 9/1976 | Pavelle et al. | 248/DIG. 5 X |
| 4,477,048 | 10/1984 | Conway | 248/444.1 X |
| 4,648,572 | 3/1987 | Sokol | 248/206.3 X |
| 4,696,448 | 9/1987 | Mazloom et al. | 248/311.2 |

FOREIGN PATENT DOCUMENTS 768018  9/1967  Canada ........................ 248/DIG. 5

*Primary Examiner*—David L. Talbott
*Attorney, Agent, or Firm*—Alvin S. Blum

[57] ABSTRACT

A tissue-dispensing box holder fastens to the interior of a motor vehicle without tools or special skills. The box is engaged by a flanged frame. The frame is forced against a reference surface, preferably the vehicle ceiling, by spring bias. A mounting member fastens to the interior glass by suction cups. The mounting member connects to the frame by flexible spring connecting means to force the box against the reference surface and to conform to the angular relationship between glass and reference surface. The flexible spring connecting means further facilitates replacement of the tissue-dispensing box when empty.

15 Claims, 2 Drawing Sheets

TISSUE DISPENSER BOX HOLDER FOR VEHICLES

BACKGROUND OF THE INVENTION

1. Field of the Invention

This invention relates to holders for tissue boxes and more particularly to means whereby a dispensing carton of tissues may be readily mounted within the passenger compartment of a motor vehicle without tools or special skills.

2. Discription of the Prior Art

Holders for tissue-dispensing boxes for motor vehicles are generally well known as exemplified by the following U.S. Pat. Nos. 2,488,326, 2,278,011, 2,287,581, 2,836,386, 3,843,085, 3,982,717, 3,288,416, 3,913,810, 3,917,207. However, the holder of the present invention is considered to be a significant improvement over the devices of the prior art in its ease of installation without the use of tools, its adaptability to a convenient location in diverse motor vehicle interiors and the ease with which the empty tissue box may be replaced by a full box.

SUMMARY OF THE INVENTION

It is accordingly an object of the present invention to provide a holder for a disposable dispensing box of tissues that is readily installed in motor vehicles in a convenient location without the need for tools or special skills.

It is a further object to provide a holder that holds said box firmly in place while tissues ae being removed therefrom yet permits easy removal of an empty box and replacement with a full box without the use of tools or special skills.

These and other objects and advantages are achieved according to the present invention by providing a frame of a size and shape to receive therein a dispensing box of tissues. The frame includes vertical walls for surrounding the sides of the box, the frame is open on a first face through which the box is installed and removed. The frame is partially closed on a second face by a flange extending substantially horizontally and inwardly from said vertical walls a short distance so that the opening in the second face is smaller that the box but big enough to provide access to the tissue dispensing slot in the box.

An elongate mounting member is flexibly connected to the frame. The mounting member includes at least one, and preferably two or more suction cups. The suction cups are applied to an inner glass surface such as a windshield or window of the vehicle in such a position that the frame is springably urged against a reference surface, such as the ceiling, with the flanged face of the frame directed away from the reference surface. When a tissue box is in the frame, the flanged face of the frame presses the box firmly against the reference surface so that a tissue may be dispensed with one hand while the holder holds the box firmly against the reference surface. To replace the box, the frame is pulled away from the reference surface far enough to permit removal of the box through the open face of the frame. The spring bias of the mounting means may be provided by the inherent springy structure of the elongate member itself or may include an auxiliary spring means.

The improved holder both as to its construction and its mode of operation, together with additional features and advantages thereof, will be best understood upon perusal of the following detailed description and accompanying drawings.

DETAILED DESCRIPTION OF PREFERRED EMBODIMENTS

Figure 1:
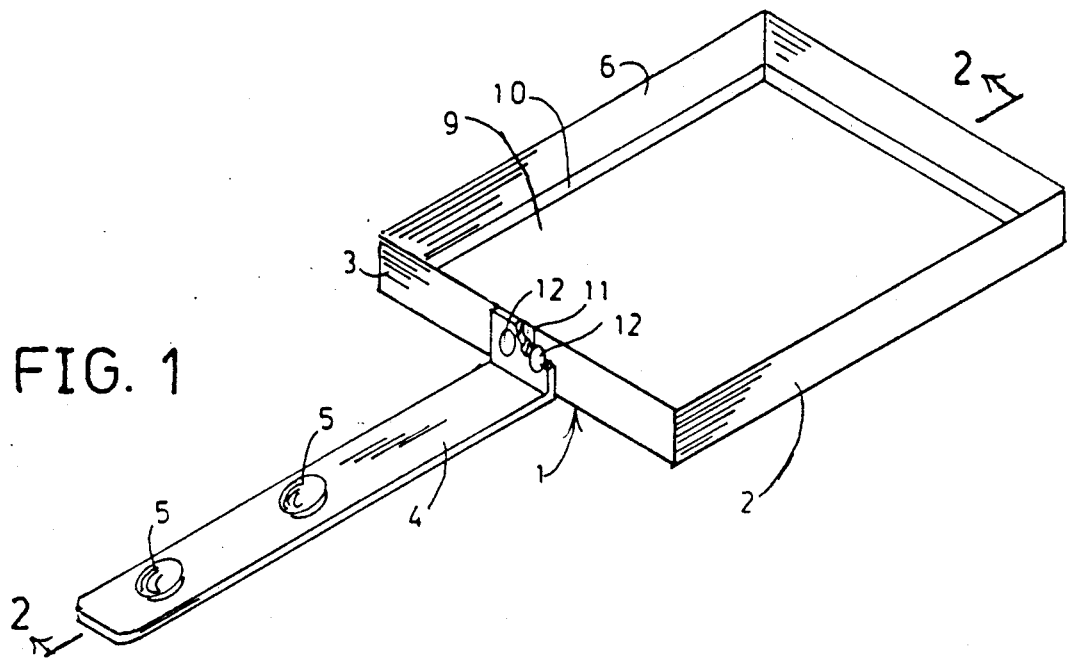
FIG. 1 is a perspective view of a holder according to the invention.
Figure 2:
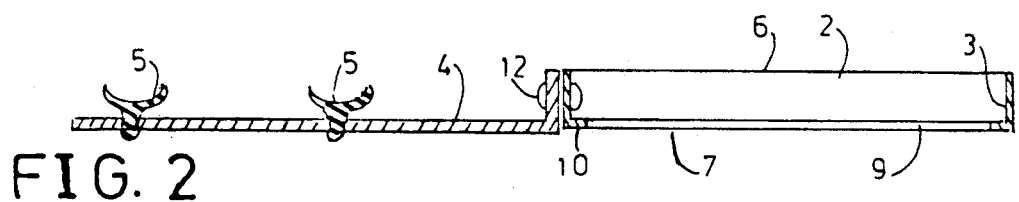
Fig. 2 is a cross-sectional view of the holder of FIG. 1 taken through the plane 2—2.

Referring first to FIGS. 1 and 2, the holder 1 includes a rectangular frame 2 having four vertical sides walls 3 connected to support member 4. A pair of rubber suction cups 5 are attached to support member 4. The frame is of a size and shape to admit a tissue box through the open face 6. A flanged face 7 has an opening 9 in flange 10 that is small enough to retain the box in the frame and yet large enough to expose the slot in the box through which tissues are dispensed. The frame 2 is formed by bending an L-shaped aluminum extrusion into a rectangle. The joint 11 formed by the ends of the bent extrusion is held together by the two rivets 12 which also join support member 4 to frame 2. Support member 4 may be formed of springy stainless steel.

Figure 3:
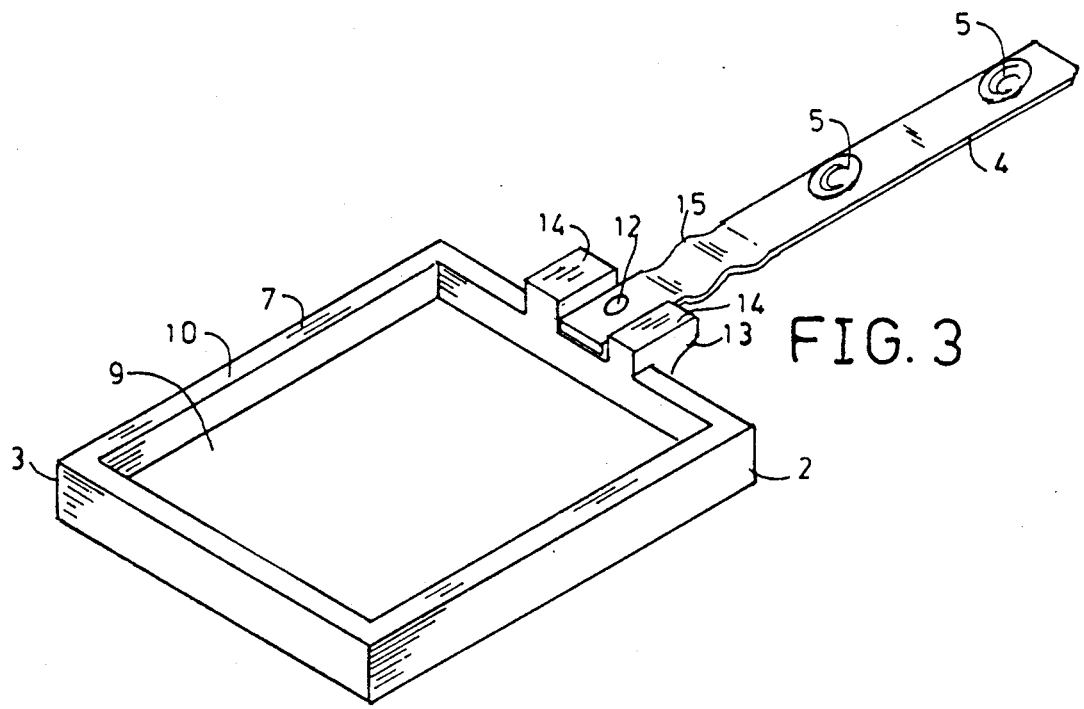
FIG. 3 is a perspective view of an alternative embodiment of the invention with a molded frame.

In the embodiment of FIG. 3 shown with the flanged face 7 uppermost, the frame 2 is molded in one piece of plastic. A projection 13 receives one end of the support member 4. A single rivet 12 securely fastens frame 2 to support member 4 with raised portions 14 of projection 13 preventing rotation about the rivet 12. Alternatively, member 4 may be secured to frame 2 by staking, cementing, or other fastening means well known in the art. Alternatively, support member 4 and frame 2 may be molded in one piece. The suction cups 5 are secured to support member 4 through holes in the member by suction cup securing means well known in the art. The support member 4 of FIG. 3 is shown with corrugations 15 to increase spring action at that location.

Figure 4:
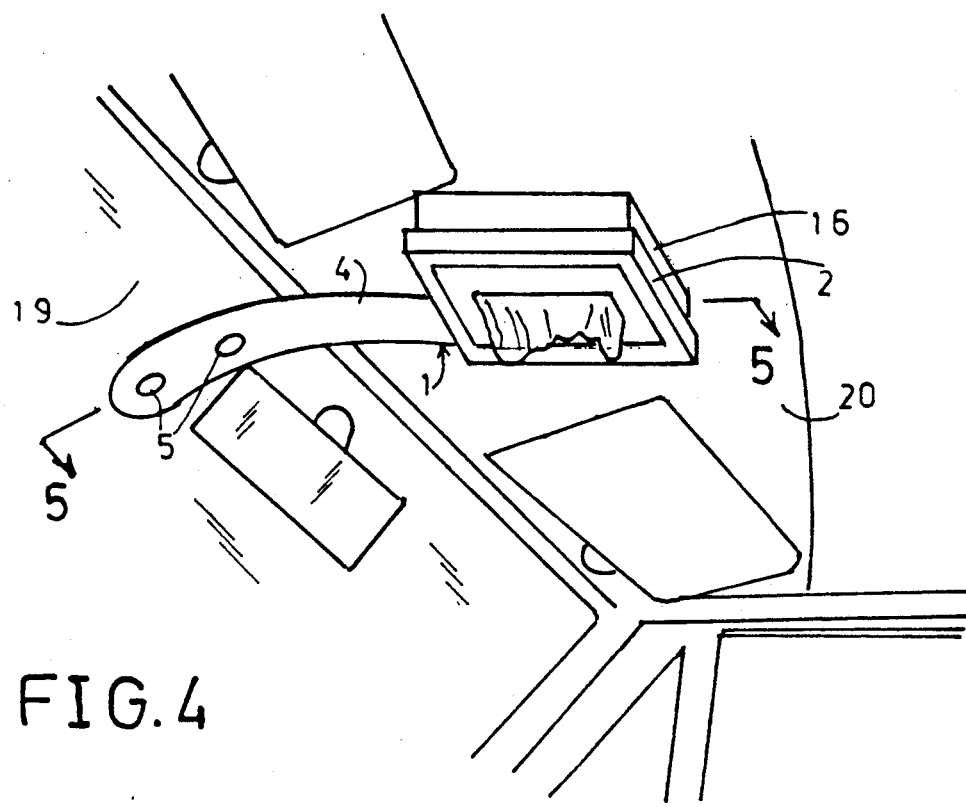
FIG. 4 is a perspective view of a vehicle interior with the holder attached to the windshield.
Figure 5:
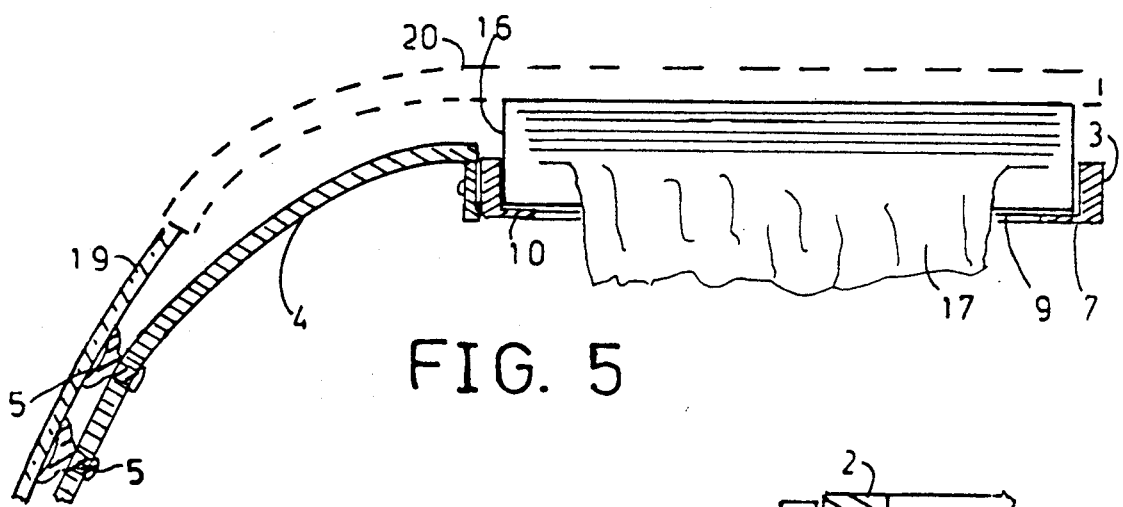
FIG. 5 is a cross-sectional view of the holder of FIG. 4 taken through the plane 5—5.
Figure 6:
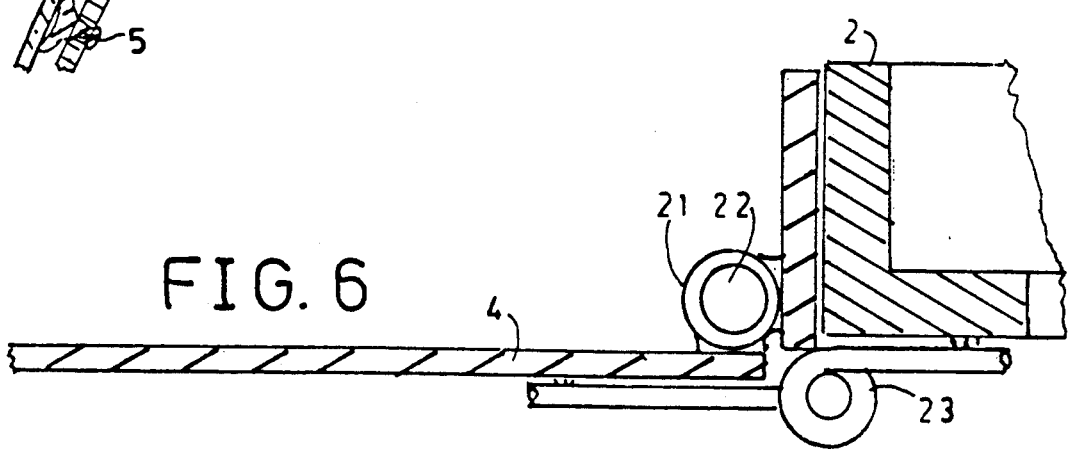
FIG. 6 is a cross-sectional detail of a spring-loaded hinge embodiment of the holder.

FIGS. 4 and 5 show the holder in use inside an automobile. The frame 2 holds tissue dispenser box 16 permitting tissues 17 to be pulled through opening 9 in flanged face 7. The support member 4 is held to windshield glass 19 by suction cups 5. The support member is flexible and springy, bending to conform to the curvature of the windshield 19 and ceiling 20. The springy nature of member 4 forces the flange 10 of frame 2 against box 16, forcing it against ceiling 20 and holding it securely so that tissues may be pulled from the box with one hand. By pulling frame 2 downwardly, one may replace the box when it is empty. The support member 4 may be formed of a transparent springy plastic to enhance visibility through the glass. Alternatively, as shown in FIG. 6, the flexible connection between frame 2 and support member 4 may include a hinge means 21 rotating about hinge pin 22 and biased by spring 23.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. A holder for resiliently holding a dispensing box of tissues in place against a reference surface in a motor vehicle, said box having substantially vertical sides, a first, closed face and a second, dispensing face with a tissue-dispensing slot through which tissues are dispensed, said holder comprising:
   a. a frame for engaging said box, said frame including substantially vertical walls for surrounding said sides of said box and a flange means extending inwardly from the lower edge of said walls toward the interior of said frame, said flange means having a central opening sufficiently large to provide access to said tissue-dispensing slot in said box and sufficiently small to ensure secure contact of said flange means with said dispensing face of said box in forcing said box against said reference surface;
   b. narrow, elongate support member means connected to said frame at a narrow end of said support member means for holding said frame firmly in position and springably forcing said closed face of said box against said reference surface;
   c. suction cup means connected to said support member means for fastening said support member means to a glass surface in said motor vehicle without the need for tools or special skills;
   d. said support member means including spring bias means for springably forcing said frame against said reference surface when said suction cup means are attached to said glass surface, said spring bias means providing sufficient resiliency to permit said frame to be pulled away from said reference surface far enough to enable a user to replace said box when it is empty without detaching said suction cup means from said glass surface, and
   in which said support member means is a thin strip of metal and said spring bias means is inherent in the springy quality of the metal itself.

2. The holder according to claim 1, in which said springy quality of said support member means is enhanced by shaping said strip into a generally corrugated springy shape.

3. The holder according to claim 1, in which said support member means is sufficiently resilient to conform sufficiently to the shape of said glass and said reference surface to enable said holder to be attached without tools or special skills.

4. The holder according to claim 1, in which said frame is constructed from an L-shaped profile shaped into a rectangle.

5. The holder according to claim 1, in which said frame is molded in one piece.

6. The holder according to claim 1, in which said suction cup means includes at least one suction cup.

7. A holder for resiliently holding a dispensing box of tissues in place against a reference surface in a motor vehicle, said box having substantially vertical sides, a first, closed face and a second, dispensing face with a tissue-dispensing slot through which tissues are dispensed, said holder comprising:
   a. a frame for engaging said box, said frame including substantially vertical walls for surrounding said sides of said box and a flange means extending inwardly from the lower edge of said walls toward the interior of said frame, said flange means having a central opening sufficiently large to provide access to said tissue-dispensing slot in said box and sufficiently small to ensure secure contact of said flange means with said dispensing face of said box in forcing said box against said reference surface;
   b. narrow, elongate support member means connected to said frame at a narrow end of said support member means for holding said frame firmly in position and springably forcing said closed face of said box against said reference surface;
   c. suction cup means connected to said support member means for fastening said support member means to a glass surface in said motor vehicle without the need for tools or special skills;
   d. said support member means including spring bias means for springably forcing said frame against said reference surface when said suction cup means are attached to said glass surface, said spring bias means providing sufficient resiliency to permit said frame to be pulled away from said reference surface far enough to enable a user to replace said box when it is empty without detaching said suction cup means from said glass surface, and
   in which said support member means is a thin strip of plastic and said spring bias means is inherent in the springy quality of the plastic itself.

8. The holder according to claim 7, in which said springy quality of said support member means is enhanced by shaping said strip into a generally corrugated springy shape.

9. The holder according to claim 7, in which said springy quality of said support member means is enhanced by shaping said strip into a generally corrugated springy shape.

10. The holder according to claim 7, in which said support member means is sufficiently resilient to conform sufficiently to the shape of said glass and said reference surface to enable said holder to be attached without tools or special skills.

11. The holder according to claim 7, in which said support member means is transparent to enhance visibility through said glass.

12. The holder according to claim 7, in which said frame is constructed from an L-shaped profile shaped into a rectangle.

13. The holder according to claim 7, in which said frame is molded in one piece.

14. The holder according to claim 7, in which said frame and said support member means are molded in one piece.

15. The holder according to claim 7, in which said suction cup means includes at least one suction cup.

* * * * *